United States Patent
Wu et al.

(10) Patent No.: US 11,830,482 B2
(45) Date of Patent: Nov. 28, 2023

(54) METHOD AND APPARATUS FOR SPEECH INTERACTION, AND COMPUTER STORAGE MEDIUM

(71) Applicant: BAIDU ONLINE NETWORK TECHNOLOGY (BEIJING) CO., LTD., Beijing (CN)

(72) Inventors: Zhen Wu, Beijing (CN); Yufang Wu, Beijing (CN); Hua Liang, Beijing (CN); Jiaxiang Ge, Beijing (CN); Xingyuan Peng, Beijing (CN); Jinfeng Bai, Beijing (CN); Lei Jia, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 545 days.

(21) Appl. No.: 16/895,318

(22) Filed: Jun. 8, 2020

(65) Prior Publication Data
US 2021/0151039 A1 May 20, 2021

(30) Foreign Application Priority Data
Nov. 14, 2019 (CN) .......................... 201911115505.1

(51) Int. Cl.
*G10L 15/18* (2013.01)
*G10L 15/26* (2006.01)

(52) U.S. Cl.
CPC .......... *G10L 15/1815* (2013.01); *G10L 15/26* (2013.01)

(58) Field of Classification Search
CPC . G10L 15/1815; G10L 15/26; G10L 15/1822; G06F 40/169; G06F 40/30; G06F 16/3329; G06F 16/3344
See application file for complete search history.

(56) References Cited

U.S. PATENT DOCUMENTS 11,107,462 B1 * 8/2021 Fuegen ................. G10L 15/22
11,355,098 B1 * 6/2022 Zhong .................. G10L 15/22
(Continued)

FOREIGN PATENT DOCUMENTS

CN 108549656 A 9/2018
CN 108563790 A 9/2018
(Continued)

OTHER PUBLICATIONS

Office Action for Chinese Application No. 201911115505.1, dated Jun. 10, 2020, 20 pages.
(Continued)

*Primary Examiner* — Paras D Shah
*Assistant Examiner* — Athar N Pasha
(74) *Attorney, Agent, or Firm* — Lippes Mathias LLP

(57) ABSTRACT

Embodiments of the present disclosure relate to a method and an apparatus for speech interaction, and a computer readable storage medium. The method may include determining text information corresponding to a received speech signal. The method also includes obtaining label information of the text information by labeling elements in the text information. In addition, the method further includes determining first intention information of the text information based on the label information. The method further includes determining a semantic of the text information based on the first intention information and the label information.

12 Claims, 3 Drawing Sheets

(56) References Cited

U.S. PATENT DOCUMENTS

| | | | | |
|---|---|---|---|---|
| 2019/0378499 A1* | 12/2019 | Miller | ............... | G06F 3/167 |
| 2020/0302919 A1* | 9/2020 | Greborio | ............ | G10L 15/1822 |
| 2020/0312311 A1* | 10/2020 | Bodenstab | ........... | G10L 15/183 |
| 2020/0410012 A1* | 12/2020 | Moon | ............... | G06N 5/022 |
| 2021/0090570 A1* | 3/2021 | Aharoni | ............ | H04M 1/663 |

FOREIGN PATENT DOCUMENTS

| | | |
|---|---|---|
| CN | 108959257 A | 12/2018 |
| CN | 109241524 A | 1/2019 |
| CN | 110309277 A | 10/2019 |
| WO | 2019142427 A1 | 7/2019 |

OTHER PUBLICATIONS

Office Action for Japanese Application No. 2020-185935, dated Jan. 4, 2022, 4 pages.

* cited by examiner

METHOD AND APPARATUS FOR SPEECH INTERACTION, AND COMPUTER STORAGE MEDIUM

CROSS-REFERENCE TO RELATED APPLICATION

The present application is based upon and claims priority to Chinese Patent Application No. 201911115505.1, filed on Nov. 14, 2019, the entirety contents of which are incorporated herein by reference.

FIELD

Embodiments of the present disclosure mainly relate to a field of artificial intelligence, and more particularly to a method and an apparatus for speech interaction, and a computer readable storage medium.

BACKGROUND

Speech interaction technology is technology that a human interacts with a machine by using a speech, implementing speech interaction experience similar to a natural dialogue. A human-machine interaction ranges from an interaction of a mouse and a keyboard with a screen in the computer era to a direct interaction of a touch screen in the intelligent phone era. A human-machine interaction mode becomes simple, and an interaction threshold is getting lower and lower. With rapid development of artificial intelligence and mobile Internet, a natural speech interaction similar to an interaction between the human and the other human has gradually become a new way of the human-machine interaction. The speech interaction has advantages such as a large input bandwidth, high accuracy, good mobility, and low usage threshold, and is one of preferred interaction modes for the human-machine interaction. The human-machine interaction is implemented through the speech interaction, thereby improving an information processing efficiency. At the same time, such speech interaction may enable the interaction between a user and the machine easier. However, there are still problems to be solved during the speech interaction.

SUMMARY

According to exemplary embodiments of the present disclosure, a solution for speech interaction is provided.

In an aspect of the present disclosure, a method for speech interaction is provided. The method may include determining text information corresponding to a received speech signal. The method further includes obtaining label information of the text information by labeling elements in the text information. In addition, the method also includes determining first intention information of the text information based on the label information. The method further includes determining a semantic of the text information based on the first intention information and the label information.

In another aspect of the present disclosure, an apparatus for speech interaction is provided. The apparatus may include: a non-transitory computer-readable medium including computer-executable instructions stored thereon, and an instruction execution system which is configured by the instructions to implement at least one of: a text information determining module, a label module, a first intention determining module, and a semantic determining module. The text information determining module is configured to determine text information corresponding to a received speech signal. The label module is configured to obtain label information of the text information by labeling elements in the text information. The first intention determining module is configured to determine first intention information of the text information based on the label information. The semantic determining module is configured to determine a semantic of the text information based on the first intention information and the label information.

In another aspect of the present disclosure, a computer readable storage medium is provided. The computer readable storage medium has a computer program stored thereon. When the computer program is executed by a processor, the processor is caused to implement a method for speech interaction. The method may include determining text information corresponding to a received speech signal. The method further includes obtaining label information of the text information by labeling elements in the text information. In addition, the method also includes determining first intention information of the text information based on the label information. The method further includes determining a semantic of the text information based on the first intention information and the label information.

It should be understood that, descriptions in Summary of the present disclosure are not intended to limit an essential or important feature in embodiments of the present disclosure, and are also not construed to limit the scope of the present disclosure. Other features of the present disclosure will be easily understood by following descriptions.

BRIEF DESCRIPTION OF THE DRAWINGS

The above and other features, advantages and aspects of respective embodiments of the present disclosure will become more apparent with reference to accompanying drawings and following detailed illustrations. In the accompanying drawings, the same or similar numeral references represent the same or similar elements, in which.

DETAILED DESCRIPTION

Figure 1:
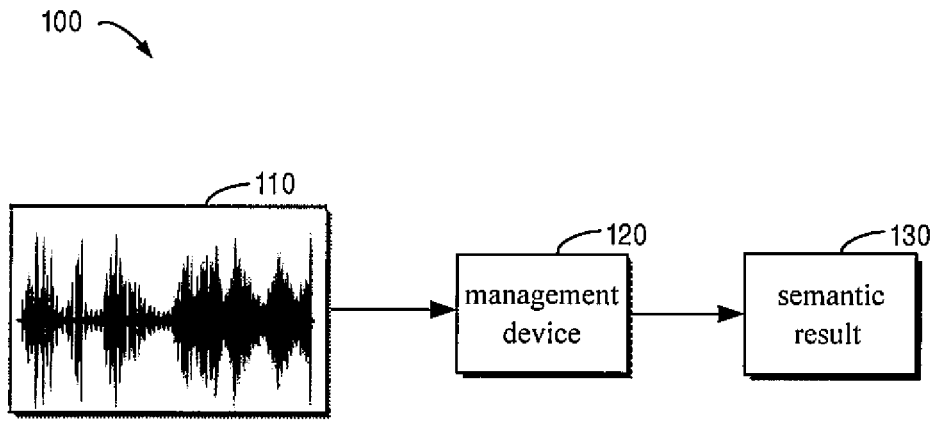
FIG. 1 is a schematic diagram illustrating an exemplary scene in which a plurality of embodiments of the present disclosure may be implemented.

Description will be made in detail below to embodiments of the present disclosure with reference to accompanying drawings. Some embodiments of the present disclosure are illustrated in the accompanying drawings. However, it should be understood that, the present disclosure may be implemented in various ways, and is not limited to the embodiments described herein. On the contrary, those embodiments provided are merely for a more thorough and complete understanding of the present disclosure. It should be understood that, the accompanying drawings and embodiments of the present disclosure are merely for exemplary purposes, and are not used to limit the protection scope of the present disclosure.

In the description of embodiments of the present disclosure, terms such as "include" and its equivalents should be understood as an inclusive meaning, i.e. "include but not limited to". Terms such as "based on" should be understood as "at least partially based on". Terms such as "an embodiment" or "the embodiment" should be understood as "at least one embodiment". Terms such as "first", "second" and the like may represent different or same objects. Other explicit and implicit definitions may also be included below.

During implementing speech interaction, a way for waking up one interaction at a time is basically adopted. The way is a product obtained by combining wake-up word detection technology with a product strategy, with characteristics that: after a user inputs a wake-up word for activating a device, a built-in wake-up word detection module detects a signal of the wake-up word, and starts to recognize and listen. When a speech tail point is detected or a preset time length is reached, the listening is finished, and the speech received is recognized, thereby achieving a procedure for responding to a user requirement.

However, there are a plurality of problems in a current human-machine interaction mode. Firstly, the user needs to wake up the device before each request, which brings a great inconvenience. Secondly, when the user does not talk to the device after waking up the device, the device may respond incorrectly, causing a poor user experience. A key to the problem is how to distinguish whether recognized information is request information initiated to the device, thereby responding to a real request of the user in time and automatically shielding a non-user request. The user experience may be greatly damaged when a request initiated by the user is not responded or a request of a non-human-machine interaction is mistakenly responded. Therefore, how to improve an accuracy for judging the human-machine/non-human-machine interaction is a core issue of a solution for multiple interactions.

According to embodiments of the present disclosure, an improvement solution for the speech interaction is provided. In this solution, by introducing a semantic understanding technology, a semantic result may be derived based on text information of speech recognition. In addition, in combination with an improved semantic understanding model based on a deep neural network and an online real-time intervention mechanism, a semantic result with high accuracy may be obtained. Furthermore, a judgment result of whether the text information is human-machine interaction information or non-human-machine interaction information may be obtained from information such as the above semantic result, a context state, and an acoustic confidence based on the depth neural network. In this solution, it may be determined whether a speech interaction device should respond to an obtained speech signal and a detailed request of the speech signal from a plurality of dimensions, thereby more accurately and intelligently implementing speech interaction control and, improving user experience.

FIG. 1 is a schematic diagram illustrating an exemplary scene 100 in which a plurality of embodiments of the present disclosure may be implemented. In the exemplary scene 100, when a human-machine interaction is performed, an obtained speech signal 110 is transmitted to a management device 120.

The speech signal 110 may be obtained by any speech interaction device that performs interaction with a user. In some embodiments, when the user speaks to the speech interaction device, a speech signal 110 may be obtained. In some embodiments, when the speech interaction device locates around the user, the speech interaction device may obtain the speech signal 110 when the user interacts with others. In some embodiments, the speech signal 110 may also be other speech signal received by the speech interaction device, such as a speech from a television. In some embodiments, the speech signal 110 is obtained by the speech interaction device that performs multiple interactions at one wake-up. The above examples are only for describing the present disclosure and are not detailed limitations to the present disclosure.

The speech interaction device may have an associated sound collector (e.g., one or more microphones) to collect a speech instruction of the user. The speech interaction device may also have an associated sound player (e.g., one or more speakers) to play a sound.

The speech interaction device may be any electronic device capable of controlling and/or interacting through the speech signal. Some examples of the speech interaction device may include, but be not limited to, an intelligent speaker, a speech interaction television box, an intelligent household appliance, a speech home-schooling appliance, an intelligent robot, a map navigation device, an intelligent wearable device, etc. The speech interaction device may also be any electronic device installed with a speech interaction application. The speech interaction application may be such as a speech assistant application, an intelligent car machine system, an information query application, a map application, a social platform application, an audio and video playing application, an intelligent assistant application, etc. Examples of the electronic device on which such speech interactive application may be installed may include, but be not limited to, an intelligent phone, a multimedia computer, a multimedia tablet, an Internet node, a communicator, a desktop computer, a laptop computer, a notebook computer, a netbook computer, a tablet computer, a personal navigation device, a personal digital assistant (PDA), an audio/video player, a digital camera/video camera, a pointing device, an electronic book device, a gaming device, or any combination of the foregoing.

For example, under a case that the speech interaction device is the intelligent speaker, the speech instruction may be "play the song XXX of the singer XX" and the like, and the speech interaction device may query a corresponding song and play the song to the user after the speech signal is correctly recognized.

In the interaction procedure with the speech interaction device, the speech interaction device is generally waked up through a wake-up word, and then enters into an interaction state. The speech interaction device may support the multiple interactions at one wake-up. In a scene with the multiple interactions at one wake-up, after the speech interaction device is waked up, as long as the speech interaction device is in an operation state, such as making a sound, the user does not need to issue the wake-up word again, but may directly interact with the speech interaction device. In this way, an interaction threshold is reduced, and an interaction desire of the user is improved. In some embodiments, when the interaction belongs to a query category, such as asking about the weather, the user may continue the interaction without waking up the speech interaction device again within a time period after the speech interaction device finishes answering.

The speech signal 110 is transmitted to the management device 120 for processing. The management device 120 determines whether the speech signal 110 is a command which is issued by the user and used to be executed by the speech interaction device based on the received speech signal 110. If yes, the management device 120 sends a semantic result 130 including an execution instruction or a semantic result 130 including content to be obtained to the speech interaction device for processing.

In some embodiments, the management device 120 may be a computing device in a cloud that processes speech data uploaded by the speech interaction device. In some embodiments, the management device 120 and the speech interaction device are the same device. Therefore, the speech signal 110 may also be processed by the speech interaction device that receives the speech signal 110. The speech interaction device directly recognizes whether the speech signal 110 is a command to be executed. In some embodiments, the management device 120 includes, but is not limited to, a personal computer, a server computer, a handheld or laptop device, a mobile device (such as a mobile phone, a personal digital assistant (PDA), a media player, etc.), a multiprocessor system, a consumer electronic product, a small computer, a mainframe computer, a distributed computing scene including any of the above computers or devices, etc.

It should be understood that, the scene illustrated in FIG. 1 is exemplary only, and is not a specific limitation for the present disclosure.

Figure 2:
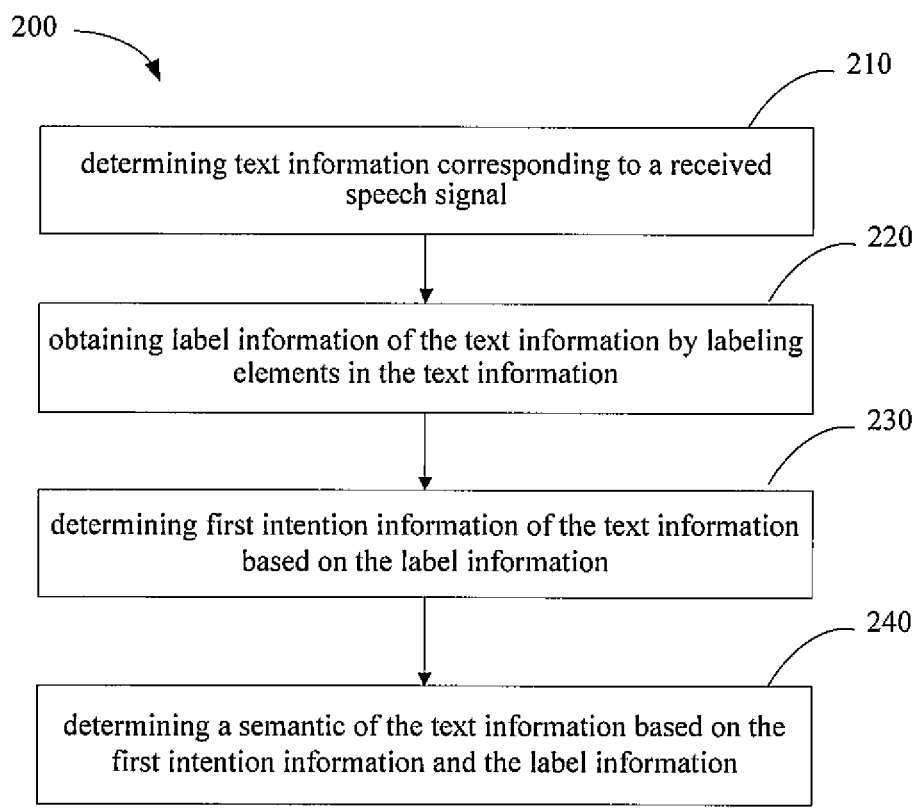
FIG. 2 is a flow chart illustrating a procedure for speech interaction according to embodiments of the present disclosure.

FIG. 2 is a flow chart illustrating a method 200 for speech interaction according to embodiments of the present disclosure. In some embodiments, the method 200 may be implemented in a device illustrated in FIG. 6. The method 200 for the speech interaction according to embodiments of the present disclosure may be described below with reference to FIG. 1. For ease of understanding, detailed data mentioned in the following description is exemplary, and is not intended to limit the protection scope of the present disclosure.

At block 210, a management device 120 may determine text information corresponding to a received speech signal 110. As an example, the speech signal 110 from a user may be converted into text information, such as, "listen to Jay Chou's song at 8 pm".

At block 220, the management device 120 may obtain label information of the text information by labeling elements in the text information. In some embodiments, the management device 120 may label an entity element in the elements. The entity element including at least one of a time, a number, a person name and a place name. As an example, the management device 120 may label "today" in a sentence "how is the weather today in Beijing" as time and label "Beijing" in the sentence "how is the weather today in Beijing" as place.

In some embodiments, the management device 120 may also label a domain of the element based on a predetermined knowledge base. As an example, a concept of the domain may be labeled by combining a domain knowledge base and a predetermined scene knowledge (the concept represents the label information here). The concept of the domain may include an entity concept of the domain, such as a singer "Jay Chou" and a song in a music domain, a TV play, a movie, a cartoon, an actor and the like in a video domain. The concept of the domain may also include a non-entity concept of the domain, such as "listening" and "song" in the music domain, "watching" and "video" in the video domain, etc.

In some embodiments, the management device 120 may also label a replaceable element in the elements based on a context-free grammar. As an example, for text information of "Call A", the "A" may be labeled as a contact concept based on the context-free grammar.

In addition, in order to avoid ambiguity or mislabeling, context ambiguity resolution may be performed based on pre-determined and offline trained entity resources.

Alternatively or additionally, a K-optimal path algorithm may be employed to exclude a lower ranked and redundant candidate concept, to facilitate to accelerate concept derivation.

In some embodiments, the management device 120 may also obtain a final candidate concept sequence through a concept specification. On one hand, the concept specification may facilitate to reuse a sub-concept, including an one-to-one upper-lower concept specification (e.g., labeled concept "singer" may be specified to "person"), and a many-to-one combined concept specification (e.g., labeled concept "fit"+"scene (e.g., before sleep)"+"listening" may be specified to "scene"). On the other hand, the concept specification may also accelerate the concept derivation by reducing inverted candidates.

At block 230, the management device 120 may determine first intention information of the text information based on the label information. In some embodiments, the management device 120 may determine a plurality of candidate intention information corresponding to the label information based on a mapping relationship between the label information and the intention information. As an example, inverted intentions may be extracted based on a sequence of labeled concepts to obtain a candidate intention list. The labeled concept and index information of the intention are constructed in advance. For example, an intention of "playing music" may be extracted from concepts labeled with "song" or "listening to a song".

The management device 120 may select the first intention information from a plurality of candidate intention information. As an example, the management device 120 may remove a part of the candidate intention information from the plurality of candidate intention information under a case that the part of the candidate intention information among the plurality of candidate intention information does not satisfy a predetermined constraint condition. As an example, each candidate intention may be derived in sequence and pruned in combination with a pruning strategy. The skilled in the art should understand that a labeled concept sequence in which the concepts do not overlap with each other is a path, and the pruning strategy is the predetermined constraint condition for the concept sequence.

In some embodiments, the predetermined constraint condition may be a corresponding relationship between the labeled concept and the intention, or, the predetermined constraint condition may be whether an order of the labeled concepts (information units) is correct (e.g., the order of information units in the label information is correct), or the predetermined constraint condition may be whether the labeled concept has a plurality of values (that is, whether an array format is supported, e.g., the information unit in the label information has a plurality of values).

It should be understood that, the candidate paths may be ranked and the top-k candidate paths may be selected from the candidate paths, and a ranking condition includes a coverage length, a n-gram probability, a concept weight and a concept number of the concept sequence, and the like. When a corresponding intention in the candidate path may be further specified to a concept, the concept derivation may be continued. Therefore, the method supports to recursively derive the intention.

The management device 120 may convert a path with a score greater than a threshold value into a semantic tree, an intention corresponding to the path is taken as a root node, and a sequence of concepts (i.e., label information) in the path is taken as a first-level node.

At block 240, the management device 120 may determine a semantic of the text information based on the first intention information and the label information. Generally, domain information may be determined directly based on the intention information. Since slot information is a subset of the label information, the slot information may also be determined based on the label information. Therefore, the management device 120 may generate the semantic of the text information from the determined domain information, the intention, and the slot information.

In this way, a semantic tree integrating the domain information, the intention and the slot information may be obtained by labeling each segment in input text information with a concept, and combining and deriving the concepts based on a predefined scene knowledge, thereby deriving a semantic result 130 conforming to the speech signal 110 more flexibly than a conventional technology.

Figure 3:
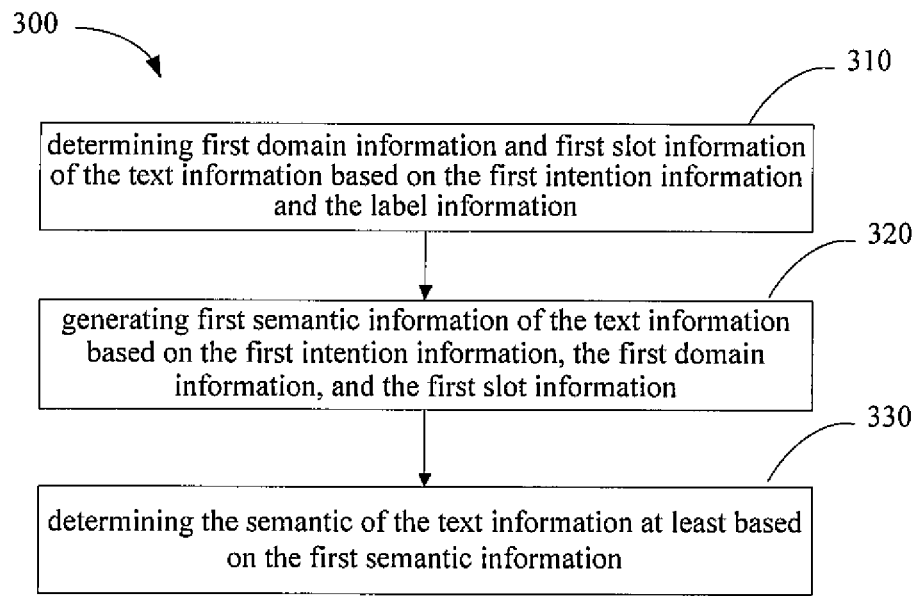
FIG. 3 is a flow chart illustrating a procedure for determining a semantic according to embodiments of the present disclosure.

FIG. 3 is a flow chart illustrating a procedure 300 for determining a semantic according to embodiments of the present disclosure. In some embodiments, a method 300 may be implemented in a device illustrated in FIG. 6. For ease of understanding, detailed data mentioned in the following description is exemplary, and is not intended to limit the protection scope of the present disclosure.

At block 310, the management device 120 may determine first domain information and first slot information of the text information based on the first intention information and the label information. In some embodiments, domain information may be determined directly based on the intention information. Since slot information is a subset of the label information, the slot information may also be determined based on the label information. In addition, a configurable semantic tree may be serialized to convert tree semantic results into a horizontal construction.

Figure 4:
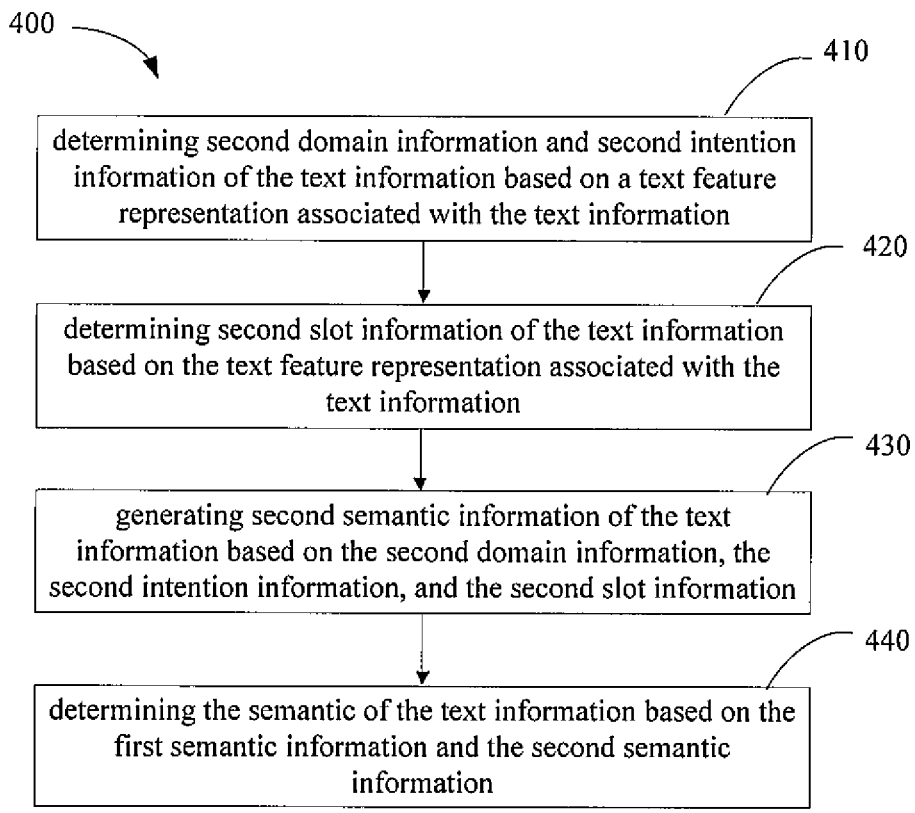
FIG. 4 is a flow chart illustrating a procedure for determining a semantic according to embodiments of the present disclosure.

At block 320, the management device 120 may generate first semantic information of the text information based on the first intention information, the first domain information, and the first slot information At block 330, the management device 120 may determine the semantic of the text information at least based on the first semantic information. According to embodiments of the present disclosure, the semantic of the text information may be determined in a plurality of ways. For example, FIG. 4 is a flow chart illustrating a procedure 400 for determining a semantic according to embodiments of the present disclosure. For ease of understanding, detailed data mentioned in the following description is exemplary and is not intended to limit the protection scope of the present disclosure.

At block 410, the management device 120 may determine second domain information and second intention information of the text information based on a text feature representation associated with the text information. In some embodiments, the text information may be converted into the text feature representation and input into a trained first neural network model to determine the second domain information and the second intention information of the text information. Preferably, the first neural network model may be a deep neural network (DNN). Alternatively or additionally, the first neural network model may be a neural network (NN), a convolutional neural network (CNN), a recursive neural network (RNN) or a self-attention neural network, etc. In this way, a correlation characteristic between the domain and the intention may be fully learned.

At block 420, the management device 120 may determine second slot information of the text information based on the text feature representation associated with the text information. In some embodiments, the text information may be converted into the text feature representation and input into a trained second neural network model to determine the second domain information and the second intention information of the text information. Preferably, the second neural network model may be the deep neural network (DNN). Alternatively or additionally, the second neural network model may be the neural network (NN), the convolutional neural network (CNN), the recursive neural network (RNN) or the self-attention neural network, etc.

At block 430, the management device 120 may generate second semantic information of the text information based on the second domain information, the second intention information, and the second slot information.

At block 440, the management device 120 may determine the semantic of the text information based on the first semantic information and the second semantic information.

In this way, problems such as high noise, high redundancy and high colloquialism appeared in a far-field speech recognition text may be solved, and a fast response speed may be extremely given consideration to. On one hand, a correlation feature between the domain and the intention may be fully learned, on the other hand, the number of models may be reduced and the response is sped up.

In some embodiments, a real-time intervention mechanism may also be integrated, and a plurality of levels of black/white lists such as text information, a keyword, a grammar and the like may be employed to freely interfere with semantic results of three granularities of the domain, the intention and the slot on line, thereby further ensuring a fast, accurate and stable response to a product requirement and ensuring online user experience.

In some embodiments, speech-semantic integration confidence technology that integrates a rule and a depth learning model may also integrate advantages of each acoustic confidence and a semantic analysis result, and make a final result judgment for the human-machine/non-human-machine interaction by considering information such as context and a client state. In the solution, with existing acoustic confidence technology, a local monosyllabic acoustic confidence, a whole sentence monosyllabic acoustic confidence, a whole sentence acoustic characteristic acoustic confidence, a semantic analysis result, a state of the preceding text, a language model score, etc., are normalized to one-dimensional or multi-dimensional input features in the neural network model. A training set is constructed and the neural network model is trained based on a large number of label results of online data. The neural network model may learn advantages of input features such as acoustic and semantic, and fuse input information such as context and an end state to generate the final judgment result for the human-machine/non-human-machine. The neural network model may be the deep neural network (DNN). Alternatively or additionally, the neural network model may be the neural network (NN), the convolutional neural network (CNN), the recursive neural network (RNN) or the self-attention neural network.

With the method, actions to be executed may be determined based on the semantic after it is determined whether the speech is a speech interacting with the speech interaction device, such that an accuracy for executing a speech instruction during the speech interaction may be improved. Meanwhile, on the premise of performing multiple interactions at one wake-up, it may be ensured that the speech instruction is not mistakenly executed and user experience is improved.

Figure 5:
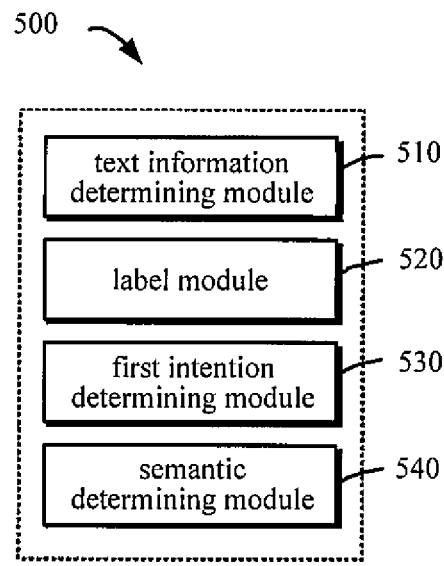
FIG. 5 is a block diagram illustrating an apparatus for speech interaction according to embodiments of the present disclosure.

FIG. 5 is a block diagram illustrating an apparatus 500 for speech interaction according to embodiments of the present disclosure. The apparatus 500 may include: a text information determining module 510, a label module 520, a first intention determining module 530, and a semantic determining module 540. The text information determining module 510 is configured to determine text information corresponding to a received speech signal. The label module 520 is configured to obtain label information of the text information by labeling elements in the text information. The first intention determining module 530 is configured to determine first intention information of the text information based on the label information. The semantic determining module 540 is configured to determine a semantic of the text information based on the first intention information and the label information.

In some embodiments, the semantic determining module 540 may include: a domain and slot determining module (not illustrated), a generating module (not illustrated) for first semantic information, and a semantic generating module (not illustrated).

The domain and slot determining module is configured to determine first domain information and first slot information of the text information based on the first intention information and the label information. The generating module for first semantic information is configured to generate the first semantic information of the text information based on the first intention information, the first domain information, and the first slot information. The semantic generating module is configured to determine the semantic of the text information at least based on the first semantic information.

In some embodiments, the semantic generating module may include: a domain and intention determining module (not illustrated), a slot determining module (not illustrated), a generating module for second semantic information (not illustrated), and a semantic result determining module (not illustrated). The domain and intention determining module is configured to determine second domain information and second intention information of the text information based on a text feature representation associated with the text information. The slot determining module is configured to determine second slot information of the text information based on the text feature representation associated with the text information. The generating module for second semantic information is configured to generate the second semantic information of the text information based on the second domain information, the second intention information, and the second slot information. The semantic result determining module is configured to determine the semantic of the text information based on the first semantic information and the second semantic information.

In some embodiments, the label module may include at least one of: an entity label module (not illustrated), a domain label module (not illustrated) and a replaceable element label module (not illustrated). The entity label module is configured to label an entity element in the elements, the entity element comprising at least one of a time, a number, a person name and a place name. The domain label module is configured to label a domain for each of the elements based on a predetermined knowledge base. The replaceable element label module is configured to label a replaceable element in the elements based on a context-free grammar.

In some embodiments, the first intention determining module includes: a candidate intention determining module (not illustrated) and a first intention selecting module (not illustrated). The candidate intention determining module is configured to determine a plurality of candidate intention information corresponding to the label information based on a mapping relationship between the label information and intention information. The first intention selecting module is configured to select the first intention information from the plurality of candidate intention information.

In some embodiments, the first intention selecting module may include: a removing module (not illustrated). The removing module is configured to remove a part of the plurality of candidate intention information not satisfying a predetermined constraint condition from the plurality of candidate intention information. The predetermined constraint condition includes at least one of: an order of information units in the label information being correct; and an information unit in the label information having a plurality of values.

Figure 6:
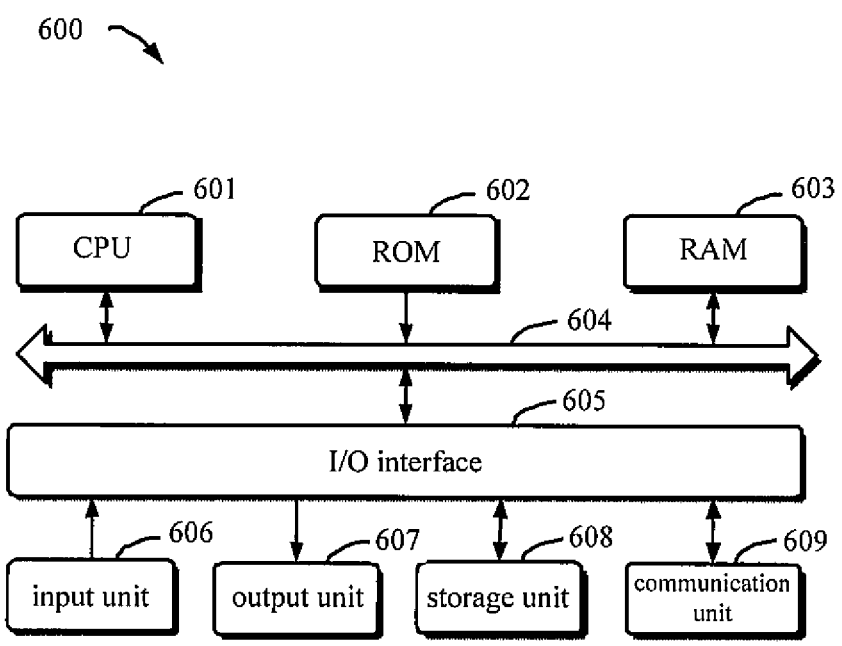
FIG. 6 is a block diagram illustrating a computing device being capable of implementing a plurality of embodiments of the present disclosure.

FIG. 6 is a block diagram illustrating an exemplary device 600 for implementing embodiments of the present disclosure. The device 600 may be configured as a management device 120 illustrated in FIG. 1. As illustrated in FIG. 6, the device 600 includes a center processing unit (CPU) 601. The CPU 601 may execute various appropriate actions and processes according to computer program instructions stored in a read only memory (ROM) 602 or computer program instructions loaded to a random access memory (RAM) 603 from a storage unit 608. The RAM 603 may also store various programs and date required by the device 600. The CPU 601, the ROM 602, and the RAM 603 may be connected to each other via a bus 604. An input/output (I/O) interface 605 is also connected to the bus 604.

A plurality of components in the device 600 are connected to the 110 interface 605, including: an input unit 606 such as a keyboard, a mouse; an output unit 607 such as various types of displays, loudspeakers; a storage unit 608 such as a magnetic disk, an optical disk; and a communication unit 609, such as a network card, a modem, a wireless communication transceiver. The communication unit 609 allows the device 600 to exchange information/data with other devices over a computer network such as the Internet and/or various telecommunication networks.

The processing unit 601 executes the above-mentioned methods and processes, such as the procedures 200, 300 and 400. For example, in some embodiments, the procedures 200, 300 and 400 may be implemented as a computer software program. The computer software program is tangibly contained a machine readable medium, such as the storage unit 608. In some embodiments, a part or all of the computer programs of the computer programs may be loaded and/or installed on the device 600 through the ROM 602 and/or the communication unit 609. When the computer programs are loaded to the RAM 603 and are executed by the CPU 601, one or more blocks of the procedures 200, 300 and 400 described above may be executed. Alternatively, in other embodiments, the CPU 601 may be configured to execute the procedures 200, 300 and 400 in other appropriate ways (such as, by means of hardware).

The functions described herein may be executed at least partially by one or more hardware logic components. For example, without not limitation, exemplary types of hardware logic components that may be used include: a field programmable gate array (FPGA), an application specific integrated circuit (ASIC), an application specific standard product (ASSP), a system on chip (SOC), a complex programmable logic device (CPLD) and the like.

Program codes for implementing the method of the present disclosure may be written in any combination of one or more programming languages. These program codes may be provided to a processor or a controller of a general purpose computer, a special purpose computer or other programmable data processing device, such that the functions/operations specified in the flowcharts and/or the block diagrams are implemented when these program codes are executed by the processor or the controller. These program codes may execute entirely on a machine, partly on a machine, partially on the machine as a stand-alone software package and partially on a remote machine or entirely on a remote machine or entirely on a server.

In the context of the present disclosure, the machine-readable medium may be a tangible medium that may contain or store a program to be used by or in connection with an instruction execution system, apparatus, or device. The machine-readable medium may be a machine-readable signal medium or a machine-readable storage medium. The machine-readable medium may include, but be not limit to, an electronic, magnetic, optical, electromagnetic, infrared, or semiconductor system, apparatus, or device, or any suitable combination of the foregoing. More specific examples of the machine-readable storage medium may include electrical connections based on one or more wires, a portable computer disk, a hard disk, a RAM, a ROM, an erasable programmable read-only memory (EPROM or flash memory), an optical fiber, a portable compact disk read-only memory (CD-ROM), an optical storage, a magnetic storage device, or any suitable combination of the foregoing.

In addition, although the operations are depicted in a particular order, it should be understood to require that such operations are executed in the particular order illustrated in the drawings or in a sequential order, or that all illustrated operations should be executed to achieve the desired result. Multitasking and parallel processing may be advantageous in certain circumstances. Likewise, although several specific embodiment details are included in the above discussion, these should not be construed as limitation of the scope of the present disclosure. Certain features described in the context of separate embodiments may also be implemented in combination in a single implementation. On the contrary, various features described in the context of the single implementation may also be implemented in a plurality of implementations, either individually or in any suitable subcombination.

Although the subject matter has been described in language specific to structural features and/or methodological acts, it should be understood that the subject matter defined in the appended claims is not limited to the specific features or acts described above. Instead, the specific features and acts described above are merely exemplary forms of implementing the claims.

What is claimed is:

1. A method for speech interaction, applied to a speech interaction device, comprising:
   determining text information corresponding to a received speech signal;
   obtaining label information of the text information by labeling elements in the text information;
   determining first intention information of the text information based on the label information;
   determining first domain information and first slot information of the text information based on the first intention information and the label information;
   generating first semantic information of the text information based on the first intention information, the first domain information, and the first slot information;
   determining second domain information and second intention information of the text information based on a text feature representation associated with the text information, wherein said determining is based on a neural network model trained on at least one of existing acoustic confidence technology, local monosyllabic acoustic confidence, whole sentence monosyllabic acoustic confidence, whole sentence acoustic characteristic acoustic confidence, semantic analysis result, state of a preceding text, or language model score;
   determining second slot information of the text information based on the text feature representation associated with the text information;
   generating second semantic information of the text information based on the second domain information, the second intention information, and the second slot information; and
   determining the semantic of the text information based on the first semantic information and the second semantic information which is different from the first semantic information.

2. The method of claim 1, wherein labeling the elements in the text information comprises at least one of:
   labeling an entity element in the elements, the entity element comprising at least one of a time, a number, a person name and a place name;
   labeling a domain for each of the elements based on a predetermined knowledge base; and
   labeling a replaceable element in the elements based on a context-free grammar.

3. The method of claim 1, wherein determining the first intention information of the text information comprises:
   determining a plurality of candidate intention information corresponding to the label information based on a mapping relationship between the label information and intention information; and
   selecting the first intention information from the plurality of candidate intention information.

4. The method of claim 3, wherein determining the first intention information from the plurality of candidate intention information comprises:
   removing a part of the plurality of candidate intention information not satisfying a predetermined constraint condition from the plurality of candidate intention information, and
   wherein the predetermined constraint condition comprises at least one of:
   an order of information units in the label information being correct; and
   an information unit in the label information having a plurality of values.

5. A non-transitory computer readable storage medium having a computer program stored thereon, wherein when the computer program is executed by a processor, the processor is caused to implement a method for speech interaction applied to a speech interaction device, and the method comprises:
   determining text information corresponding to a received speech signal;
   obtaining label information of the text information by labeling elements in the text information;
   determining first intention information of the text information based on the label information;

determining first domain information and first slot information of the text information based on the first intention information and the label information;
generating first semantic information of the text information based on the first intention information, the first domain information, and the first slot information;
determining second domain information and second intention information of the text information based on a text feature representation associated with the text information, wherein said determining is based on a neural network model trained on at least one of existing acoustic confidence technology, local monosyllabic acoustic confidence, whole sentence monosyllabic acoustic confidence, whole sentence acoustic characteristic acoustic confidence, semantic analysis result, state of a preceding text, or language model score;
determining second slot information of the text information based on the text feature representation associated with the text information;
generating second semantic information of the text information based on the second domain information, the second intention information, and the second slot information; and
determining the semantic of the text information based on the first semantic information and the second semantic information which is different from the first semantic information.

6. The computer readable storage medium of claim 5, wherein labeling the elements in the text information comprises at least one of:
labeling an entity element in the elements, the entity element comprising at least one of a time, a number, a person name and a place name;
labeling a domain for each of the elements based on a predetermined knowledge base; and
labeling a replaceable element in the elements based on a context-free grammar.

7. The computer readable storage medium of claim 5, wherein determining the first intention information of the text information comprises:
determining a plurality of candidate intention information corresponding to the label information based on a mapping relationship between the label information and intention information; and
selecting the first intention information from the plurality of candidate intention information.

8. The computer readable storage medium of claim 7, wherein determining the first intention information from the plurality of candidate intention information comprises:
removing a part of the plurality of candidate intention information not satisfying a predetermined constraint condition from the plurality of candidate intention information, and
wherein the predetermined constraint condition comprises at least one of:
an order of information units in the label information being correct; and
an information unit in the label information having a plurality of values.

9. An electronic device, comprising: a processor; and a memory for storing instructions executable by the processor; wherein the processor is configured to:

determining text information corresponding to a received speech signal;
obtaining label information of the text information by labeling elements in the text information;
determining first intention information of the text information based on the label information;
determining first domain information and first slot information of the text information based on the first intention information and the label information;
generating first semantic information of the text information based on the first intention information, the first domain information, and the first slot information;
determining second domain information and second intention information of the text information based on a text feature representation associated with the text information, wherein said determining is based on a neural network model trained on at least one of existing acoustic confidence technology, local monosyllabic acoustic confidence, whole sentence monosyllabic acoustic confidence, whole sentence acoustic characteristic acoustic confidence, semantic analysis result, state of a preceding text, or language model score;
determining second slot information of the text information based on the text feature representation associated with the text information;
generating second semantic information of the text information based on the second domain information, the second intention information, and the second slot information; and
determining the semantic of the text information based on the first semantic information and the second semantic information which is different from the first semantic information.

10. The electronic device of claim 9, wherein the processor is configured to:
label an entity element in the elements, the entity element comprising at least one of a time, a number, a person name and a place name;
label a domain for each of the elements based on a predetermined knowledge base; and
label a replaceable element in the elements based on a context-free grammar.

11. The electronic device of claim 9, wherein the processor is configured to:
determine a plurality of candidate intention information corresponding to the label information based on a mapping relationship between the label information and intention information; and
select the first intention information from the plurality of candidate intention information.

12. The electronic device of claim 11, wherein the processor is configured to:
remove a part of the plurality of candidate intention information not satisfying a predetermined constraint condition from the plurality of candidate intention information, and wherein the predetermined constraint condition comprises at least one of:
an order of information units in the label information being correct; and
an information unit in the label information having a plurality of values.

* * * * *